(12) United States Patent
Gaylord et al.

(10) Patent No.: US 7,283,695 B2
(45) Date of Patent: Oct. 16, 2007

(54) OPTICAL INTERCONNECTS IN MICROELECTRONICS BASED ON AZIMUTHALLY ASYMMETRIC LONG-PERIOD FIBER GRATING COUPLERS

(75) Inventors: Thomas K. Gaylord, Atlanta, GA (US); Brent L. Bachim, Smyrna, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 11/216,572

(22) Filed: Aug. 31, 2005

(65) Prior Publication Data

US 2006/0067617 A1    Mar. 30, 2006

Related U.S. Application Data

(60) Provisional application No. 60/605,860, filed on Aug. 31, 2004.

(51) Int. Cl.
*G02B 6/12* (2006.01)
*G02B 6/34* (2006.01)

(52) U.S. Cl. .............................. 385/14; 385/37; 385/48

(58) Field of Classification Search .................. 385/37, 385/14
See application file for complete search history.

(56) References Cited

U.S. PATENT DOCUMENTS

| | | | | |
|---|---|---|---|---|
| 3,982,810 A | * | 9/1976 | Tamir et al. .................... | 385/37 |
| 4,380,365 A | | 4/1983 | Gross ....................... | 350/96.18 |
| 4,476,161 A | * | 10/1984 | Pohle et al. ................. | 427/162 |
| 4,785,167 A | * | 11/1988 | Madrid .................... | 250/214 A |
| 5,046,800 A | | 9/1991 | Blyler, Jr. et al. .......... | 385/131 |
| 5,130,356 A | | 7/1992 | Feuerherd et al. ............ | 524/96 |
| 5,302,656 A | | 4/1994 | Kohara et al. ............... | 524/579 |
| 5,359,208 A | | 10/1994 | Katsuki et al. ................ | 257/82 |
| 5,430,817 A | * | 7/1995 | Vengsarkar ................... | 385/37 |
| 5,434,196 A | | 7/1995 | Ohkawa et al. ............. | 522/100 |
| 5,462,995 A | | 10/1995 | Hosaka et al. ........... | 525/332.1 |
| 5,581,414 A | | 12/1996 | Snyder ....................... | 359/819 |
| 5,647,039 A | * | 7/1997 | Judkins et al. ................ | 385/37 |
| 5,657,407 A | * | 8/1997 | Li et al. ....................... | 385/37 |
| 5,703,978 A | * | 12/1997 | DiGiovanni et al. .......... | 385/37 |
| 5,757,540 A | * | 5/1998 | Judkins et al. ......... | 359/337.21 |
| 5,764,829 A | * | 6/1998 | Judkins et al. ................ | 385/37 |
| 5,852,690 A | * | 12/1998 | Haggans et al. .............. | 385/37 |
| 5,864,641 A | * | 1/1999 | Murphy et al. ............... | 385/12 |
| 5,896,479 A | | 4/1999 | Vladic ........................ | 385/59 |
| 6,005,999 A | * | 12/1999 | Singh et al. ................... | 385/37 |
| 6,011,886 A | * | 1/2000 | Abramov et al. ............. | 385/37 |
| 6,021,240 A | * | 2/2000 | Murphy et al. ............... | 385/37 |
| 6,022,498 A | | 2/2000 | Buazza et al. ............. | 264/1.38 |
| 6,035,082 A | * | 3/2000 | Murphy et al. ............... | 385/37 |

(Continued)

OTHER PUBLICATIONS

Chen, et al.; Fully Embedded Board-Level Guided-Wave Optoelectronic Interconnects; Jun. 2000; Proceedings of IEEE, vol. 88, No. 6; pp. 780-793.

(Continued)

*Primary Examiner*—Michelle R. Connelly-Cushwa
*Assistant Examiner*—Rhonda S. Peace
(74) *Attorney, Agent, or Firm*—Thomas, Kayden, Horstemeyer & Risley, LLP

(57) ABSTRACT

Systems and methods, including azimuthally asymmetric fiber gratings are disclosed.

33 Claims, 11 Drawing Sheets

U.S. PATENT DOCUMENTS

| | | | |
|---|---|---|---|
| 6,039,897 | A | 3/2000 | Lochhead et al. .......... 264/1.24 |
| 6,156,394 | A | 12/2000 | Schultz Yamasaki et al. .... 427/536 |
| 6,206,673 | B1 | 3/2001 | Lipscomb et al. ....... 425/174.4 |
| 6,253,004 | B1 | 6/2001 | Lee et al. ..................... 385/31 |
| 6,259,567 | B1 | 7/2001 | Brown et al. ............... 359/668 |
| 6,262,414 | B1 | 7/2001 | Mitsuhashi .................. 250/216 |
| 6,272,275 | B1 | 8/2001 | Cortright et al. ........... 385/129 |
| 6,278,817 | B1 * | 8/2001 | Dong ........................... 385/37 |
| 6,281,508 | B1 | 8/2001 | Lee et al. .................... 250/396 |
| 6,427,041 | B1 * | 7/2002 | Strasser et al. ................ 385/37 |
| 6,432,328 | B2 | 8/2002 | Hamanaka et al. ......... 264/1.36 |
| 6,500,603 | B1 | 12/2002 | Shioda ........................ 430/321 |
| 6,865,320 | B1 * | 3/2005 | Westbrook .................. 385/37 |
| 6,870,991 | B2 * | 3/2005 | Ohta et al. .................... 385/50 |
| 6,885,792 | B2 * | 4/2005 | Eggleton et al. .............. 385/37 |
| 6,892,001 | B2 * | 5/2005 | Ohta et al. .................... 385/37 |
| 2002/0041745 | A1 * | 4/2002 | Lee et al. ................... 385/114 |
| 2006/0013527 | A1 * | 1/2006 | Morel et al. .................. 385/24 |

OTHER PUBLICATIONS

Wiesmann, et al.; Singlemode Polymer Waveguides for Optical Backplanes; Dec. 5, 1996; Electronics Letters, vol. 32, No. 25; pp. 2329-2330.

Barry, et al.; Highly Efficient Coupling Between Single-Mode Fiber and Polymer Optical Waveguides; Aug. 1997; IEEE Transactions on Components, Packaging, and Manufacturing Technology—Part B, vol. 20, No. 3; pp. 225-228.

Lee, et al.; Fabrication of Polymeric Large-Core Waveguides for Optical Interconnects Using a Rubber Molding Process; Jan. 2000; IEEE Photonics Technology Letters, vol. 12, No. 1; pp. 62-64.

Schmeider, et al.; Electro-Optical Printed Circuit Board (EOPCB); 2000 Electronic Components and Technoogy Conference; pp. 749-753.

Mederer, et al.; 3Gb/s Data Transmission With GaAs VCSELs Over PCB Integrated Polymer Waveguides; Sep. 2001; IEEE Photonics Technology Letters, vol. 13, No. 9; pp. 1032-1034.

Schröder, et al.; Polymer Optical Interconnects for PCB; 2001; Session 13: Photonic Polymers II; pp. 337-343.

Glukh, et al.; High performance Polymeric Materials for Waveguide Applications; Aug. 2000; SPIE—The International Society for Optical Engineering, inear, Nonlinear, and Power Limiting Organics, San Diego, vol. 4106; pp. 1-11.

Liu, et al.; Plastic VCSEL Array Packaging and High Density Polymer Waveguides for Board and Backplane Optical Interconnect; 1998; Electronic Components and Technology Conference; pp. 999-1005.

Bakir, et al.; Sea of Dual Mode Polymer Pillar I/O Interconnections for Gigascale Integration; 2003; IEEE International Solid State Circuits Conference; 8 pages.

Beuret, et al.; Microfabrication of 3D Multidirectional Inclined Structure by UV lithography and Electroplating; Micro Electro Mechanical Systems, 1994, MEMS'94, Proceedings, IEEE Workshop on Jan. 25-28, 1994; pp. 81-85.

Wang, et al.; Studies on A Novel Flip-Chip Interconnect Structure-Pillar Bump; Electronic Components and Technology Conference, 2001, Proceedings, 51st, 29 May 1, Jun. 2001; pp. 945-949.

Bakir, et al.; Sea of Polymer Pillars: Dual-Mode Electrical Optical Input/Output Interconnections; in Proc. of Int. Interconnect Technology Conference; pp. 77-79; 2003.

Bakir, et al.; Sea of Polymer Pillars: Compliant Wafer-Level Electrical-Optical Chip I/O Interconnections; IEEE Photonics Technology Letters, vol. 15, No. 11, Nov. 2003; pp. 1567-1569.

Bakir, et al.; Optical Transmission of Polymer Pillars for Chip I/O Optical Interconnections; IEEE Photonics Technology Letters, vol. 16, No. 1, Jan. 2004; pp. 117-119.

Chandrasekhar, et al.; Modeling and Characterization of the Polymer Stud Grid Array (PSGA) Package: Electrical, Thermal and Thermo-Mechanical Qualification; IEEE Transactions on Electronics Packaging Manufacturing, vol. 26, No. 1, Jan. 2003; pp. 54-67.

Bakir, et al; Sea of Polymer Pillars Electrical and Optical Chip I/O Interconnections for Gigascale Integration; IEEE Transactions on Electron Devices; vol. 51, No. 7; Jul. 2004; pp. 1069-1077.

Bakir, et al.; Integration of Optical Polymer Pillars Chip I/O Interconnections with Si MSM Photodetectors; IEEE Transactions on Electron Devices; vol. 51, No. 7; Jul. 2004; pp. 1084-1090.

W. Wayt Gibbs; Computing at the Speed of Light; Scientific American; Nov. 2004; pp. 81-87.

John Baliga; Polymer Pillars for Optical and Electrical Signals; Semiconductor International; Dec. 2004; p. 36.

Richard Ball; ISSCC: Polymer Pillars Used to Connect Die; Electronics Weekly Archive; Feb. 2003.

Ron Wilson; Session Examines Novel Semiconductor Devices; EE Times; Feb. 12, 2003; URL: http://eetimes.com/article/showArticle.jhtml?articleID=18308034.

* cited by examiner

OPTICAL INTERCONNECTS IN MICROELECTRONICS BASED ON AZIMUTHALLY ASYMMETRIC LONG-PERIOD FIBER GRATING COUPLERS

CROSS-REFERENCE TO RELATED APPLICATION

This application claims priority to co-pending U.S. provisional application entitled, "Optical Interconnects in Microelectronics based on Azimuthally Azymmetric Long-Period Fiber Grating Couplers," having Ser. No. 60/605,860, filed Aug. 31, 2004, which is entirely incorporated herein by reference.

TECHNICAL FIELD

The present disclosure is generally related to optical fiber gratings and, more particularly, embodiments of the present disclosure are related to grating coupling for chip and/or wafer-level optical interconnects and methods of use.

BACKGROUND

There is a critical need for highly integrated wafer-level optical interconnections in microelectronics at the die-to-module/board level. Input/output (I/O) interconnections between die and board have traditionally been provided by metallic conductors. Electrical interconnects, however, have inherent limitations which include high noise, high drive powers, impedance matching requirements, tradeoff between data rate and distance, insufficient densities/data rates, and expensive redesign. Optical interconnects, on the other hand, have the potential for low noise, low drive power, high density, high data rates, simplified design and redesign. Due to the above performance limitations of electrical interconnects, not only have optical interconnects replaced electrical interconnects for long distance communications, but optical interconnects are also being developed for chip-to-chip I/O interconnections. Micro-optical devices and interconnects can potentially greatly enhance the performance of a micro-system by leveraging high-bandwidth, low-latency, cross-talk-resilient, and low-power communication networks. The projected off-chip communication speed for some chip I/O's is as high as 56.843 GHz at the 18-nm technology node. The introduction of optical I/O interconnection adds new constraints and new problems. Among these is the ability to fabricate prototype optically interconnected micro-systems and limited-production, application-specific, optically interconnected micro-systems.

SUMMARY

Systems and methods, including azimuthally asymmetric fiber grating are disclosed. A representative embodiment of a system, among others, includes an optical fiber including at least one azimuthally asymmetric fiber grating, and a device, wherein the azimuthally asymmetric fiber grating couples an optical signal frequency from the optical fiber to the device.

Another representative embodiment of a system, among others, includes an optical fiber including at least one azimuthally asymmetric fiber grating, and a device including at least one optical element, wherein at least one azimuthally asymmetric fiber grating is aligned with the optical element, and wherein the azimuthally asymmetric fiber grating couples a first optical frequency to the optical element.

A representative embodiment of a method, among others, includes aligning an interconnection plane with a device including at least one optical element, aligning an optical fiber including at least one azimuthally asymmetric fiber grating with the interconnection plane so that at least one azimuthally asymmetric fiber grating is aligned with the optical element, and bonding the optical fiber to the interconnection plane.

Another representative embodiment of a method, among others, includes aligning an optical fiber including at least one azimuthally asymmetric fiber grating with an interconnection plane so that, when the interconnection plane is aligned with a device including at least one optical element, at least one azimuthally asymmetric fiber grating is aligned with the optical element; bonding the optical fiber to the interconnection plane; and aligning the interconnection plane with the device so that the azimuthally asymmetric fiber grating is aligned with the optical element.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The initial use of optical fibers by telecommunication companies confirmed that data transmission over optical fibers was a reliable and economical alternative to conventional methods. Increases in transmission rates, reduction in size, and consistency of manufacturing quality have driven the incorporation of optical networks to improve overall performance of electronic systems down to the chip and/or wafer level. Optical fibers can be used as optical interconnects between circuits on one or more chips. Coupling of optical signals between the fiber and the chip and/or wafer-level circuits can be accomplished by using optical gratings. Azimuthally asymmetric fiber gratings accomplish this by laterally coupling light through the side of the fiber.

Long-Period Fiber Gratings (LPFGs) are typically used as static band-rejection filters, static spectral shapers for high-power broadband sources, static gain equalizers for optical amplifiers, static filters for amplified spontaneous emission in erbium-doped fiber amplifiers, static wavelength stabilizers for pump diodes in optical amplifiers, sensors for refractive index, temperature, and strain, fiber optic polarizers, and all-optical switches. Embodiments of the present disclosure use LPFGs as couplers to couple light into and out of the fiber through the side of the fiber. This is enabled and made efficient by an azimuthally asymmetric grating in the fiber such as, but not limited to, carbon dioxide laser induced long-period fiber gratings. Embodiments of the LPFGs can be conveniently implemented using carbon dioxide laser pulses to produce intentional azimuthally varying refractive index profiles suitable for coupling applications. LPFGs can be implemented using other lasers based on the type of optical fiber used. Examples of these combinations can include, but are not limited to, ultraviolet and/or femtosecond-pulse lasers combined with polarization-maintaining fiber, D-shaped fiber, or specially doped single-mode fiber. Implementation of azimuthally varying gratings disposed in optical fibers is discussed in "Optical Fiber Gratings with Azimuthal Refractive Index Perturbation, Method of Fabrication, and Devices for Tuning, Attenuating, Switching, and Modulating Optical Signals," U.S. Pat. No. 6,832,023, which is hereby incorporated by reference. Azimuthally varying grating elements are formed via direct illumination of the fiber at a desired periodicity based on the wavelength of a selected transmission signal. The combination of period spacing between the grating elements and number of elements is chosen to optimize the coupling of the transmitted light in the region of the selected wavelength. While the following descriptions focus on LPFGs, it is to be understood that the present disclosure includes other in-fiber gratings such as, but not limited to, short-period fiber Bragg gratings, tilted gratings, superstructure gratings, and the like.

Figure 1A:
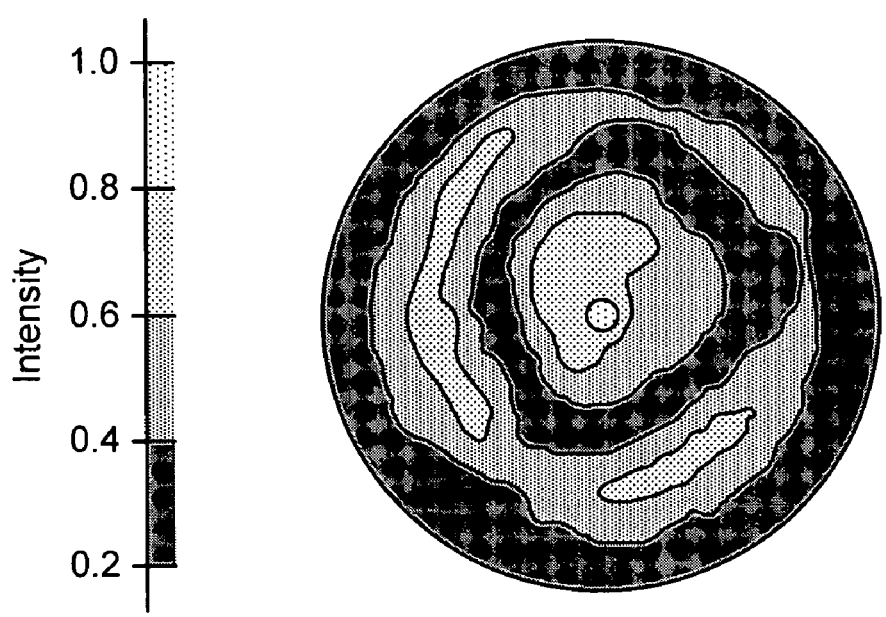
FIG. 1A is a graphical representation of light from an azimuthally asymmetric long-period fiber grating.
Figure 1B:
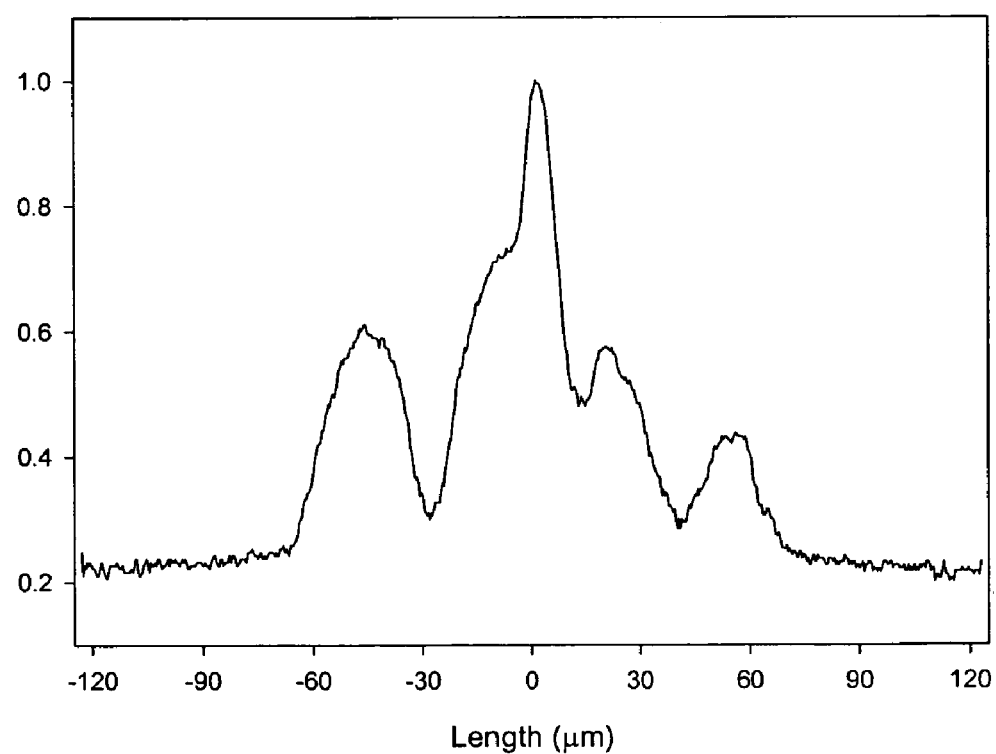
FIG. 1B is a plot of light from an azimuthally asymmetric long-period fiber grating.

An advantage of using azimuthally asymmetric LPFGs for coupling is illustrated by the light patterns emerging from an azimuthally asymmetric LPFG, which are shown in FIG. 1A and in FIG. 1B. From the image in FIG. 1A, it is evident that the intensity of the light is not constant around the circumference for a given radius (azimuthal variation). The plot in FIG. 1B also indicates the azimuthal variation by showing the normalized intensity of the light in FIG. 1A through the vertical center along the horizontal length. The intensity variation along the azimuthal direction is evident from the difference in heights between corresponding peaks in the positive and negative length regions of the plot. Efficient coupling into and out of the fiber can occur with the azimuthally asymmetric light variations produced by azimuthally asymmetric LPFGs.

LPFG devices use optical fibers that incorporate azimuthally asymmetric LPFGs for coupling light into and out of a fiber through the side of the fiber. The azimuthally asymmetric LPFGs can perform lateral coupling in the optical fiber. The present disclosure incorporates optical fibers with azimuthally asymmetric LPFGs to make LPFG optical interconnections in microelectronic applications including, but not limited to, intra-chip, chip-to-chip, intra-board, board-to-board, and fiber-to-fiber interconnections, and combinations thereof. LPFG optical interconnects include a combination of optical fibers and LPFG couplers disposed in those fibers. The LPFG couplers can stand alone to produce optical interconnections and/or can be integrated with other types of optical interconnects.

In addition to large-scale production of optical interconnections in microelectronics, the LPFG devices may be used for prototyping and production of optical interconnects in microelectronics. Due to the inherent flexibility of using one or more individual optical fibers incorporating fiber-grating couplers, it is possible to rapidly configure and/or reconfigure optically interconnected microelectronics systems. This flexibility can offer advantages in the design, development, and testing of optically interconnected microelectronics to be produced using other optical interconnect technologies. Embodiments of the devices can also produce limited-quantity application-specific optically interconnected microelectronics modules.

Embodiments of optical interconnects in microelectronics based on azimuthally asymmetric LPFG couplers are described below. It should be emphasized that the described embodiments are merely possible examples of implementations, and are set forth for a clear understanding of the principles of the present disclosure, and in no way limit the scope of this disclosure. While the following descriptions focus on LPFGs, it is to be understood that the present disclosure includes other in-fiber gratings such as, but not limited to, short-period fiber Bragg gratings.

Figure 2A:
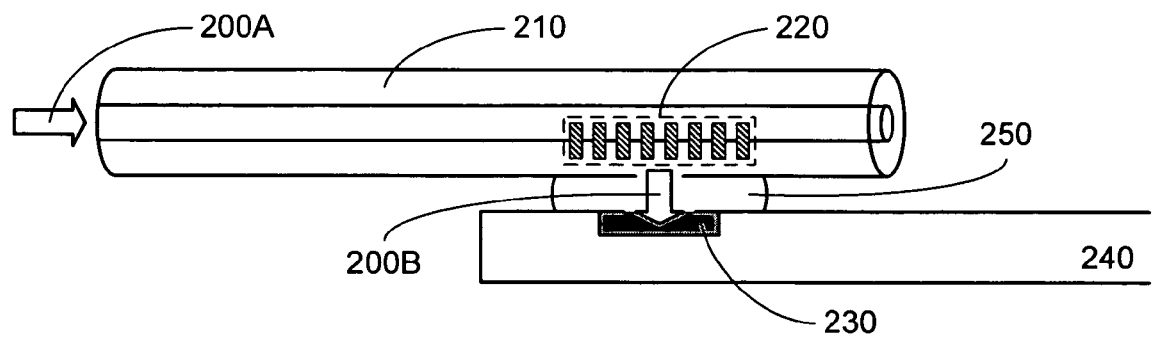
FIG. 2A is a schematic representation of an embodiment of a fiber-to-chip coupling.

FIG. 2A illustrates an embodiment of a fiber-to-chip coupling. In this regard, an incoming optical signal 200A is guided by an optical fiber 210. In this non-limiting embodiment, an azimuthally asymmetric long-period fiber grating (LPFG) 220 in the fiber 210 diffracts the optical signal 200B towards an optical receiver 230, such as, but not limited to, a photodetector. The LPFG 220 is aligned with the optical receiver 230 such that the transmitted optical signal 200B is detectable at the optical receiver 230. The fiber 210 is mounted on a microelectronics chip 240 containing the optical receiver 230. Preparation of the fiber 210 for mounting can be used to improve signal transmission. For example, the fiber can be altered in a manner including, but not limited to, shaping the mounting surface of the fiber 210 (e.g., flattening, making planar, and making D-shaped) to improve the coupling between the LPFG 220 and the optical receiver 230. An index-matching compound 250 (e.g., index-matching optical adhesive, epoxy, and gel) can be used to bond the fiber 210 to the chip 240. Utilizing an index-matching compound 250 with a refractive index similar to the cladding of the optical fiber 210 and the optical receiver 230 enhances coupling of the LPFG 220 and the optical receiver 230. In one non-limiting embodiment, a compound 250 with a refractive index approximately equal to the cladding of the optical fiber can be used to maximize lateral signal transmission out of the fiber. The use of index-matching compounds to maximize optical coupling is well understood by one skilled in the art. For the embodiment shown, the LPFG 220 is optimized for maximum transmission efficiency. The coupling efficiency can be from about 1 to 100% and can be optimized for particular embodiments.

Figure 2B:
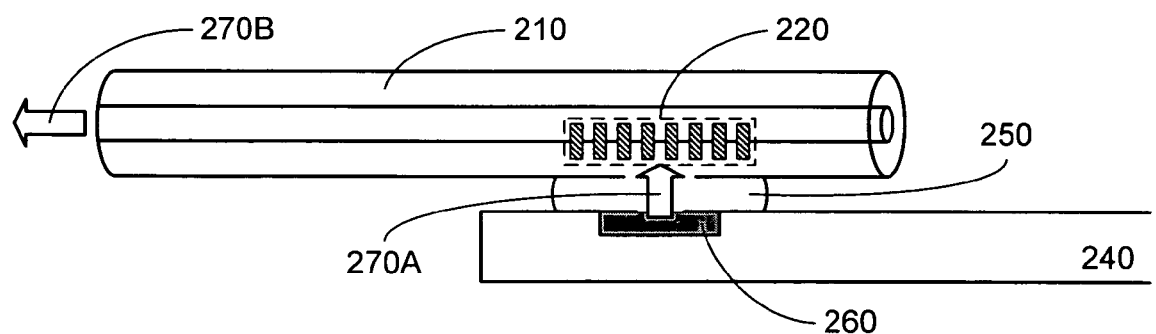
FIG. 2B is a schematic representation of an embodiment of a chip-to-fiber coupling.

FIG. 2B illustrates an embodiment of a chip-to-fiber coupling. In this depiction, an optical transmitter or light source 260 (e.g., laser and light-emitting diode) mounted on a microelectronics chip 240 emits an optical signal 270A. An azimuthally asymmetric LPFG 220 is aligned with the optical transmitter 260 such that the transmitted optical signal 270A is detectable at the LPFG 220. The LPFG 220 in the fiber 210 diffracts the optical signal 270B into an outgoing guided mode along the fiber 210. Appropriate preparation, positioning, index-matching, and bonding of the fiber 210 to the chip 240 can be used to optimize transmission of the outgoing optical signal 270B.

Figure 3:
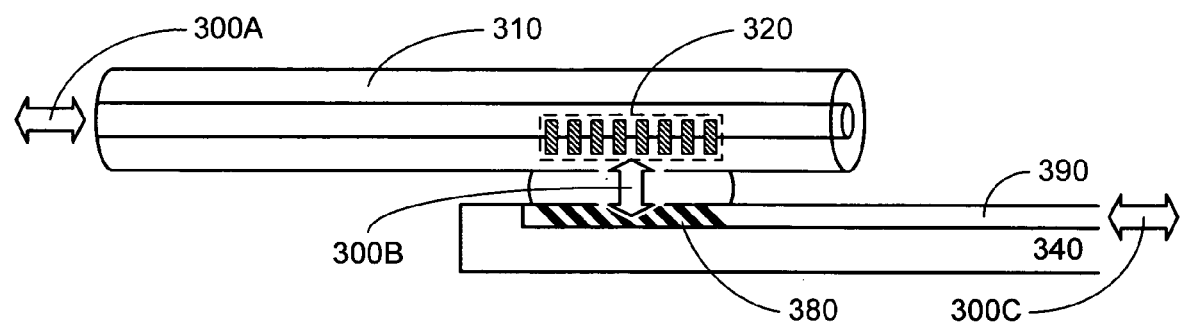
FIG. 3 is a schematic representation of an embodiment of a fiber-to-waveguide and/or waveguide-to-fiber coupling.

FIG. 3 illustrates an embodiment of a fiber-to-waveguide and/or waveguide-to-fiber coupling. In this regard, an incoming optical signal 300A is guided by an optical fiber 310. In this non-limiting embodiment, an azimuthally asymmetric LPFG 320 in the fiber 310 diffracts the optical signal 300B towards a waveguide optical element 380 (e.g., a diffractive and/or reflective element, such as, but not limited to, a volume grating, a surface-relief grating, a total internal reflection (TIR) element, or a metallic mirror). The fiber 310 is mounted on a microelectronics chip 340 containing the waveguide optical element 380. The element 380 diffracts and/or reflects the optical signal 300B into a guided mode in a waveguide 390 where the optical signal 300C is routed on the chip 340. Coupling efficiency between the LPFG 320 and the waveguide optical element 380 is highest when the refractive index of the waveguide 390 is close to the cladding of the optical fiber 310. The types of waveguides 390 can include, but are not limited to, polymer or glass-based channel (or combinations thereof), ridge, or diffused (or combinations thereof) waveguides.

In addition, an outgoing signal 300C can be guided on the chip 340 by a waveguide 390 to a waveguide optical element 380. The element 380 diffracts or reflects the optical signal 300B into an optical fiber 310 where it is diffracted by a LPFG 320 along the fiber 310. The optical fiber 310 guides the outgoing signal 300A toward its destination. Appropriate preparation, positioning, index-matching, and bonding of the fiber 310 to the chip 340 can optimize signal transmission.

In another embodiment that is not depicted, an azimuthally asymmetric LPFG in an optical fiber is aligned with a waveguide for coupling an optical signal without use of a waveguide optical element. An index-matching compound is applied between the optical fiber at the LPFG and the waveguide to enhance coupling. In this embodiment, an optical signal is guided by the optical fiber and defracted into the waveguide by the azimuthally asymmetric LPFG.

Figure 4:
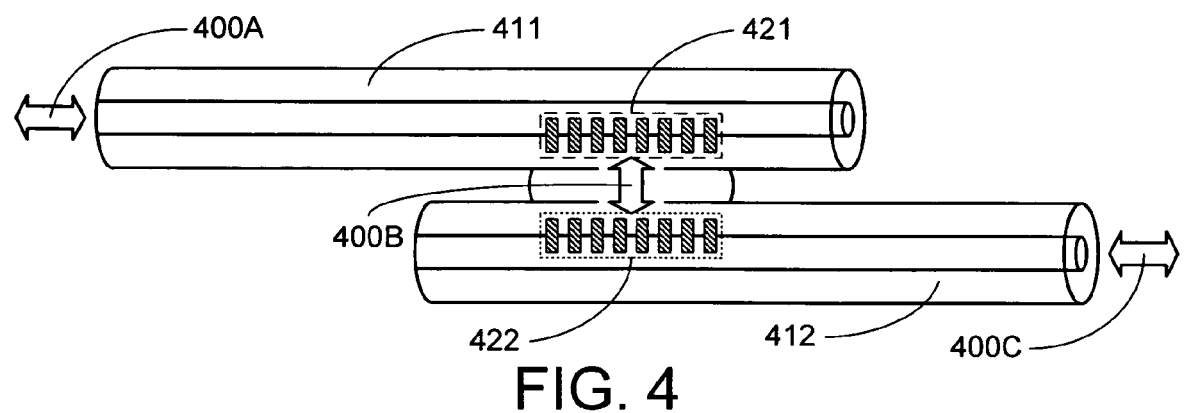
FIG. 4 is a schematic representation of an embodiment of a fiber-to-fiber coupling.

FIG. 4 illustrates an embodiment of a fiber-to-fiber coupling. In this depiction, an incoming optical signal 400A is guided by an optical fiber 411. In this non-limiting embodiment, an azimuthally asymmetric LPFG 421 in the fiber 411 diffracts the signal 400B towards a second optical fiber 412, which is acting as an optical element. A second LPFG 422 diffracts the optical signal 400B into a guided mode in the second fiber 412, where the optical signal 400C is guided toward its destination. Appropriate preparation, positioning, index-matching, and bonding of the fibers 411 and 412 can optimize signal transmission.

In addition, an outgoing signal 400C can be guided along the second optical fiber 412 to the azimuthally asymmetric LPFG 422. The LPFG 422, which is acting as an optical element, diffracts the optical signal 400B into the first optical fiber 411 where it is diffracted by a LPFG 421 along the first fiber 411. This optical fiber 411 guides the outgoing signal 400A toward its destination.

Figure 5A:
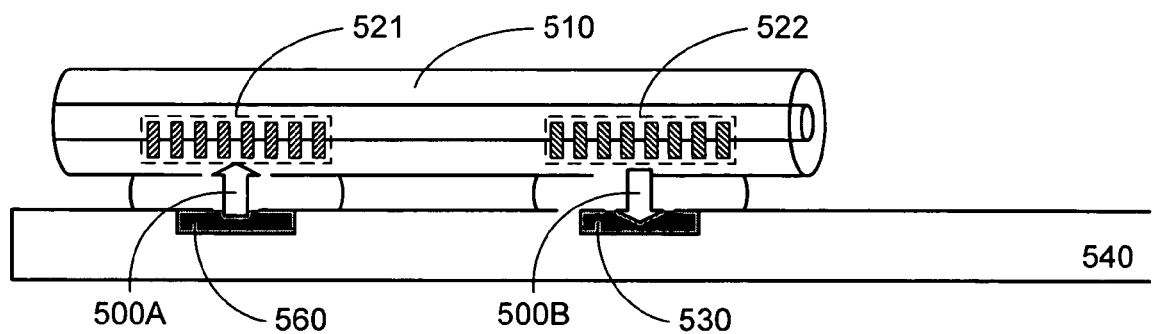
FIG. 5A is a schematic representation of an embodiment of an intra-chip coupling.

FIG. 5A illustrates an embodiment of an intra-chip coupling using long-period fiber gratings. In this non-limiting embodiment, an optical transmitter or light source 560 emits an optical signal 500A. An azimuthally asymmetric LPFG 521 diffracts the signal 500A into a guided mode along the fiber 510. A second azimuthally asymmetric LPFG 522 in the fiber 510 diffracts the signal 500B into an optical receiver 530 on the microelectronics chip 540.

Figure 5B:
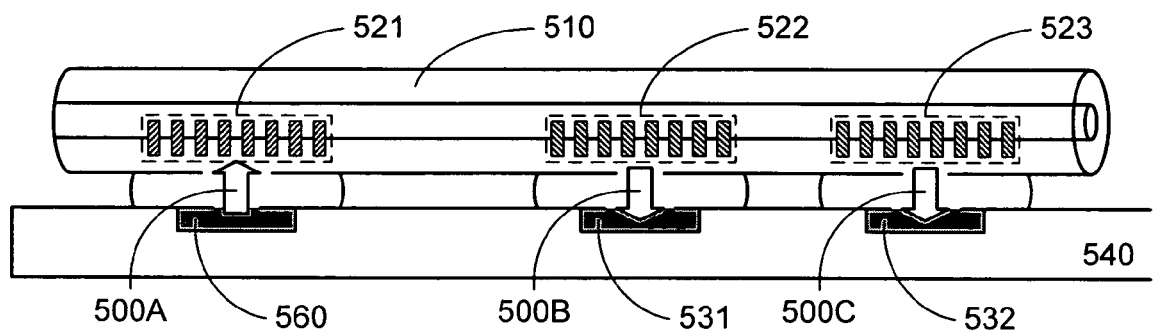
FIG. 5B is a schematic representation of an embodiment of an intra-chip fan-out coupling.

FIG. 5B illustrates an embodiment of an intra-chip fan-out coupling where an optical transmitter 560 is linked to multiple receivers 531 and 532. In this embodiment, an optical transmitter 560 on a microelectronics chip 540 emits an optical signal 500A. An azimuthally asymmetric LPFG 521 diffracts the signal 500A into a guided mode along the fiber 510. A second and a third LPFG 522 and 523, located along the fiber 510, diffract portions of the optical signal 500A into optical receivers 531 and 532. For the embodiment shown, the first out-coupling LPFG 522 diffracts a portion of the optical signal 500B into the first optical receiver 531. The remaining portion of the optical signal 500C continues along the fiber and is diffracted by the second out-coupling LPFG 523 into the second optical receiver 532. Other embodiments of intra-chip fan-out coupling can include, but are not limited to, combinations using one or more optical transmitter/LPFG pairs and/or one or more out-coupling LPFG/optical receiver pairs. Out-coupling LPFGs can be optimized to divide transmitted signals as discussed in U.S. Pat. No. 6,832,023.

Intra-chip coupling and intra-chip fan-out coupling can also be implemented using waveguides and waveguide optical elements as discussed in relation to FIG. 3. Again, out-coupling LPFGs can be optimized to divide transmitted signals as discussed in U.S. Pat. No. 6,832,023.

Figure 6A:
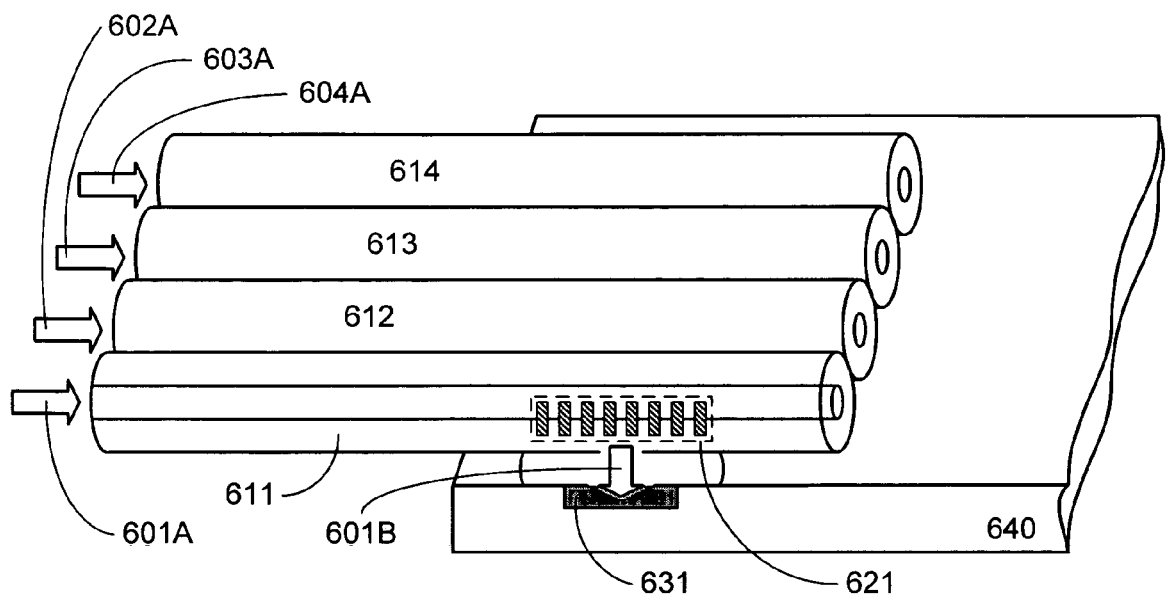
FIG. 6A is a schematic representation of an embodiment of a fiber-ribbon-to-chip coupling.

FIG. 6A illustrates an embodiment of a fiber-ribbon-to-chip coupling. In this non-limiting embodiment, an incoming optical signal 601A is guided along an optical fiber 611 in a fiber ribbon including multiple fibers 611, 612, 613, and 614. The number of fibers included in a ribbon can vary based on the application (e.g., 2 to 82). An azimuthally asymmetric LPFG 621 in the fiber 611 diffracts the optical signal 601B towards an optical receiver 631 mounted on a microelectronics chip 640. Additional incoming signals 602A, 603A, and 604A are routed along their respective fibers 612, 613, and 614 to LPFGs that diffract the signals toward separate optical receivers mounted on the microelectronics chip 640. Appropriate preparation, positioning, index-matching, and bonding during mounting of the fiber ribbon to the chip 640 can be used to optimize signal transmission.

Figure 6B:
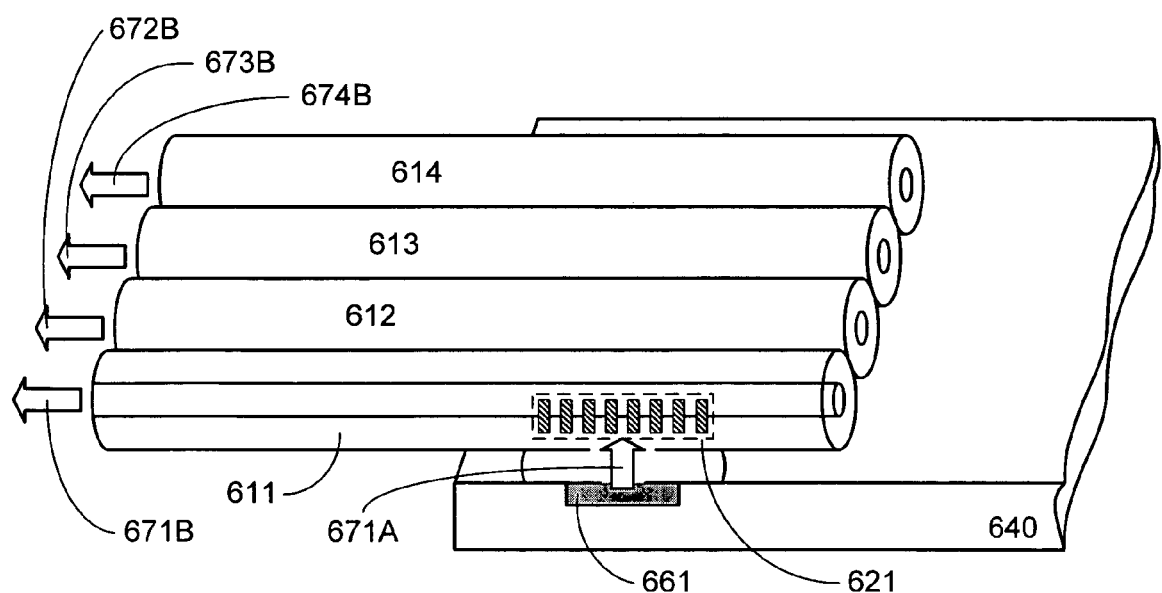
FIG. 6B is a schematic representation of an embodiment of a chip-to-fiber-ribbon coupling.

FIG. 6B illustrates an embodiment of a chip-to-fiber-ribbon coupling. In this embodiment, an optical transmitter 661 emits an optical signal 671A into an optical fiber 611 in a fiber ribbon including multiple fibers 611, 612, 613, and 614. The number of fibers included in a ribbon can vary based on the application. An azimuthally asymmetric LPFG 621 in the fiber 611 diffracts the optical signal 671B into a guided mode along the optical fiber 611. Additional outgoing signals 672B, 673B, and 674B are routed along their respective fibers 612, 613, and 614 after being emitted by optical transmitters mounted on the chip 640 and diffracted by LPFGs in the fibers 612, 613, and 614 of the fiber ribbon. The guided signals 671B, 672B, 673B, and 674B are outgoing from the fiber ribbon.

Coupling between chip and fiber ribbon can also be implemented using waveguides and waveguide optical elements for transmission of incoming and outgoing signals as discussed in relation to FIG. 3. Other possible embodiments can also include configurations where both incoming and outgoing signals are sent on separate fibers and/or the same fiber of a fiber ribbon.

Figure 7:
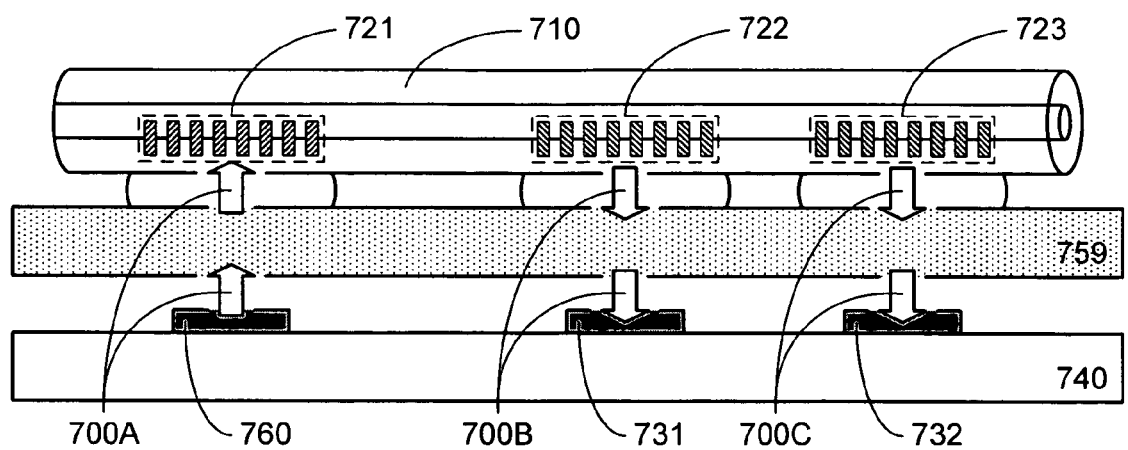
FIG. 7 is a schematic representation of an embodiment of an intra-chip fan-out coupling utilizing an optical interconnection plane.

FIG. 7 illustrates an embodiment of an intra-chip fan-out coupling utilizing an optical interconnection plane 759 mounted on and/or above a microelectronics chip 740. Signal routing can be provided by optical fibers 710 mounted on the optical interconnection plane 759. Signal transmission through the optical interconnection plane 759 can be accomplished by, but is not limited to, using wavelengths of light transparent to the substrate material or physically creating paths, vias, or through-holes for the light such as, but not limited to, metallized reflective hollows, optical dielectrics, photonic crystal waveguides, optical fibers, and combinations thereof.

In this non-limiting embodiment, an optical transmitter 760 on a microelectronics chip 740 emits an optical signal 700A. The optical signal 700A passes through the optical interconnection plane 759 and into the fiber 710 where an azimuthally asymmetric LPFG 721 diffracts the signal 700A into a guided mode along the fiber 710. A second and a third LPFG 722 and 723, located along the fiber 710, diffract portions of the optical signal 700A through the optical interconnection plane 759 and into optical receivers 731 and 732. For the embodiment shown, the first out-coupling LPFG 722 diffracts a portion of the optical signal 700B through the optical interconnection plane 759 and into the first optical receiver 731. The remaining portion of the optical signal 700C continues along the fiber and is diffracted by the second out-coupling LPFG 723 through the optical interconnection plane 759 and into the second optical receiver 732.

In addition, embodiments of intra-chip fan-out coupling on an optical interconnection plane 759 can include, but are not limited to, combinations using one or more optical transmitter/LPFG pairs and/or one or more out-coupling LPFG/optical receiver pairs. Intra-chip coupling and intra-chip fan-out coupling on an optical interconnection plane 759 can also be implemented using waveguides and waveguide optical elements as discussed in relation to FIG. 3. The types of waveguides 390 can include, but are not limited to, polymer or glass-based channel (or combinations thereof), ridge, or diffused (or combinations thereof) waveguides. Out-coupling LPFGs can be optimized to divide transmitted signals as discussed in U.S. Pat. No. 6,832,023.

Optical interconnection planes 759 also allow for preassembly of optical fibers 710 for intra-chip coupling prior to mounting on and/or above the microelectronics chip 740. This allows for separation of the optical and microelectronic production processes. Additionally, preassembly allows for separate testing of intra-chip coupling and intra-chip fan-out coupling on the interconnection plane 759 prior to and/or after mounting and testing of the microelectronics chip 740.

Figure 8A:
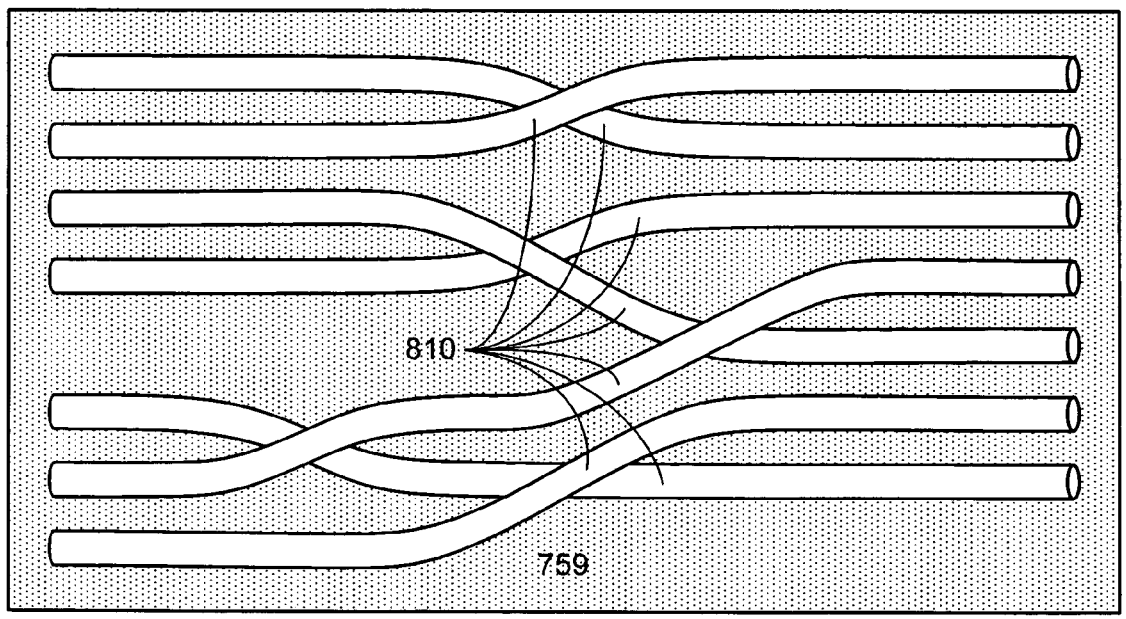
FIG. 8A is an illustration of the top view of an embodiment of an optical interconnection plane.

FIG. 8A illustrates an embodiment of a top view of an optical interconnection plane 759 mounted above the microelectronics chip 740 (FIG. 7). In this non-limiting embodiment, a number of optical fibers 810 mounted to the optical interconnection plane 759 provide routing of signals between optical elements, such as, but not limited to, optical receivers, optical transmitters, diffractive elements, and reflective elements, on the microelectronics chip 740. LPFGs in the fibers 810 are aligned with the optical elements as described in relation to FIG. 7. Using the flexibility of the fibers 810, it is possible for the fibers 810 to cross over each other, as shown, to provide routing between optical elements located at different positions across the chip.

Figure 8B:
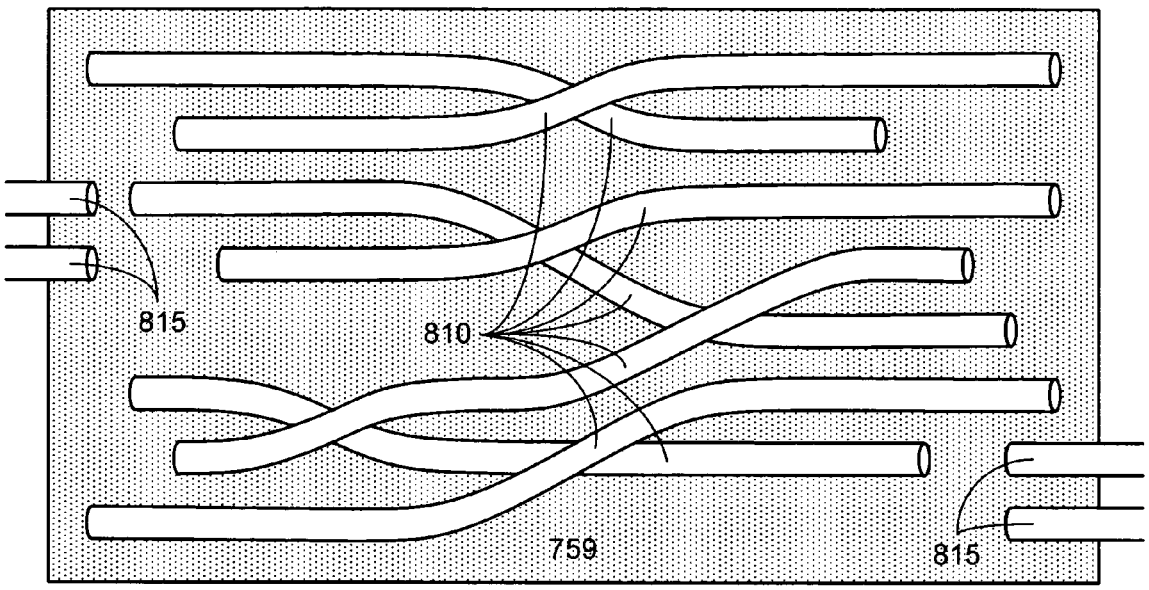
FIG. 8B is an illustration of the top view of an embodiment of an optical interconnection plane including individual optical fibers for external connections.
Figure 8C:
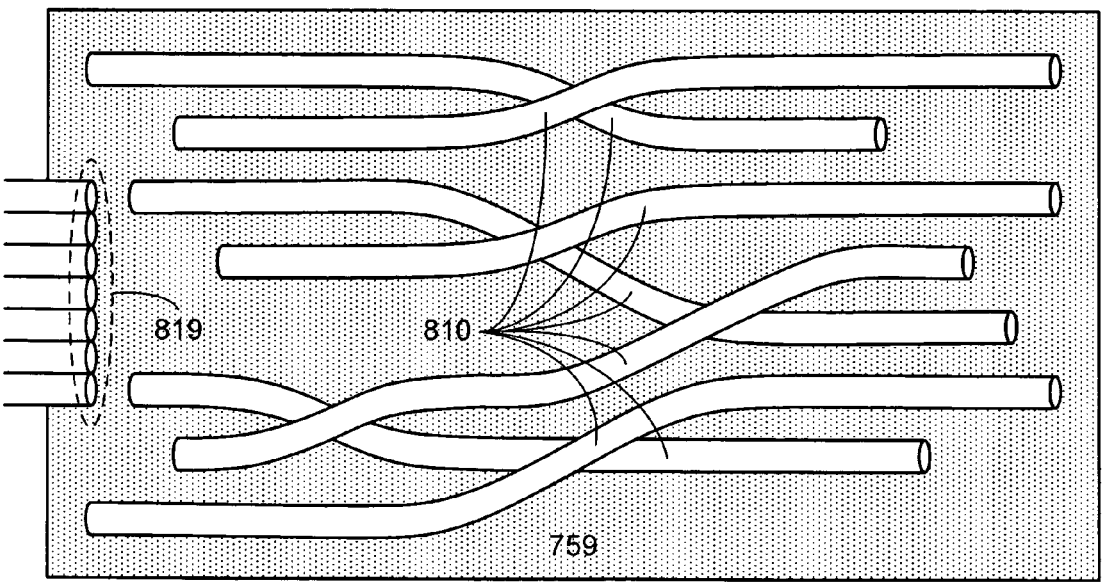
FIG. 8C is an illustration of the top view of an embodiment of an optical interconnection plane including fiber ribbon for external connections.

FIG. 8B depicts a variation of the embodiment of a top view of an optical interconnection plane 759 described in relation to FIG. 8A. In this embodiment, individual optical fibers 815 provide external connections for transmitting incoming and/or outgoing signals. Another embodiment of a top view of an optical interconnection plane 759 is shown in FIG. 8C, where a fiber ribbon 819 provides external connections for transmitting incoming and/or outgoing signals.

Figure 8D:
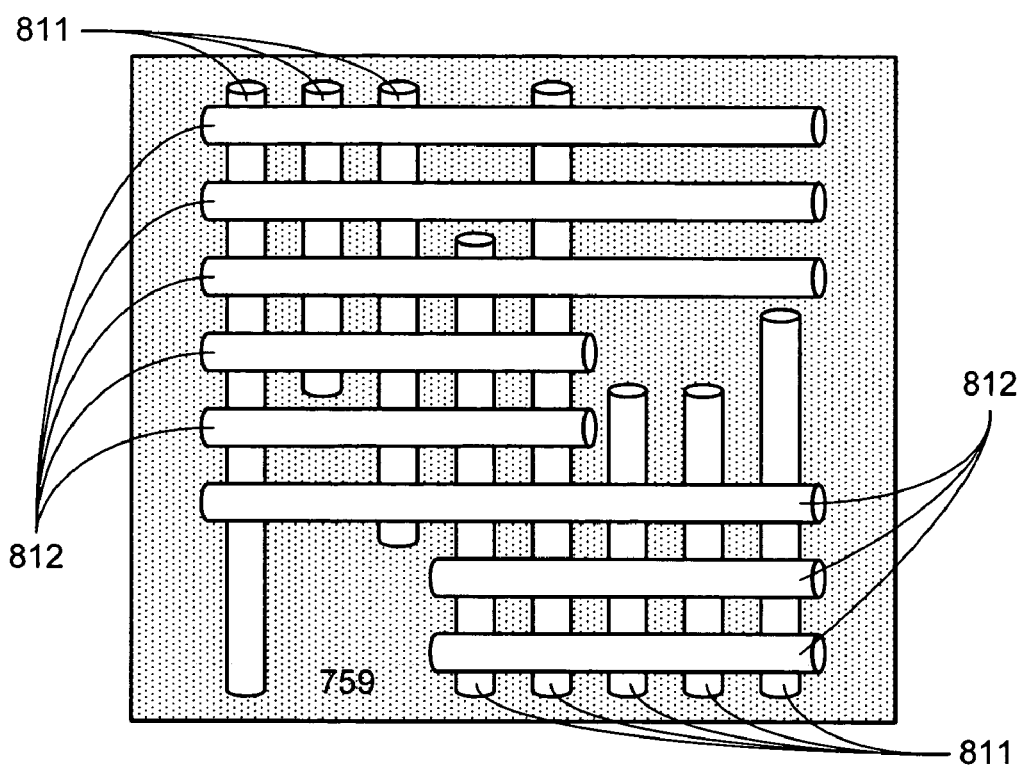
FIG. 8D is an illustration of the top view of an embodiment of an optical interconnection plane with two interconnect layers.

FIG. 8D illustrates an embodiment of a top view of an optical interconnection plane 759 mounted above a microelectronics chip 740. In this non-limiting embodiment, two layers of fibers are used to route signals between optical elements on the microelectronics chip 740. The fibers 811 in the first layer are shown vertically routed between optical elements at various locations beneath the fibers 811. The fibers 812 in the second layer are shown horizontally routed between optical elements at various locations beneath the fibers 812. The horizontally oriented fibers 812 are shown passing over the first layer of fibers 811 to form the second layer.

Figure 8E:
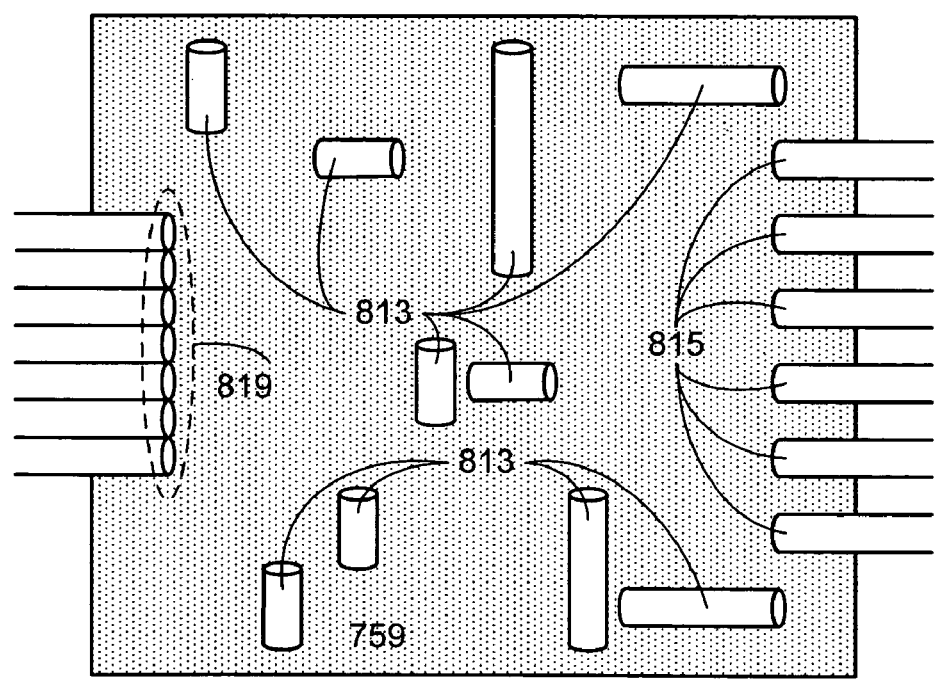
FIG. 8E is an illustration of the top view of an embodiment of an optical interconnection plane including individual optical fibers and fiber ribbon for external connections.

FIG. 8E illustrates a variation of the embodiment of a top view of an optical interconnection plane 759 described in relation to FIG. 8D. In this embodiment, optical fibers 813 route signals vertically and horizontally in a single layer. Individual optical fibers 815 and fiber ribbon 819 provide external connections for transmitting incoming and/or outgoing signals.

Other embodiments can include, but are not limited to, optical fibers oriented in one or more directions, fibers crossing over one or more fibers, fibers routed in one or more layers, one or more individual fibers and/or one or more fiber ribbons for external connections, and combinations thereof.

Figure 9:
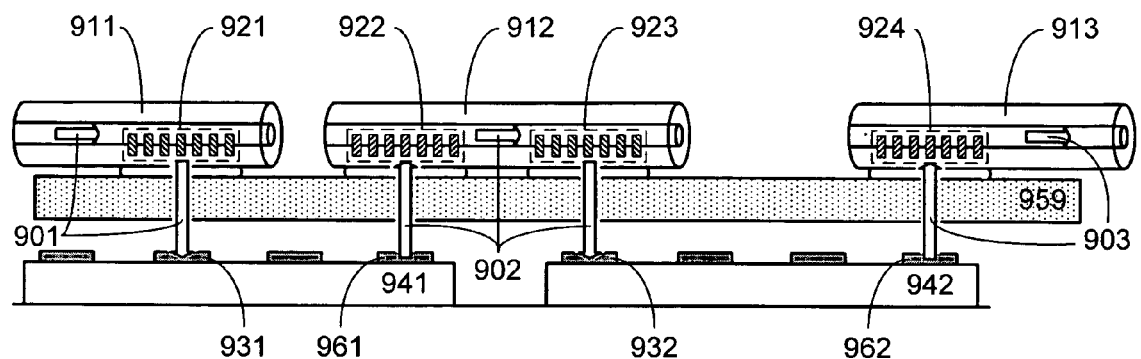
FIG. 9 illustrates an embodiment of a multi-chip coupling utilizing an optical interconnection plane 959 mounted on and/or above microelectronics chips 941 and 942. In this non-limiting embodiment, incoming signals 901 are guided by optical fibers 911. Azimuthally asymmetric LPFGs 921 in the fibers 911 diffract the signals 901 through an optical interconnection plane 959 and into optical receivers 931 on a microelectronics chip 941. In other embodiments, multiple out-coupling LPFGs 921 can be utilized to send the incoming signal 901 to multiple receivers 931. The LPFGs 921 can be optimized to divide transmitted signals 901 as discussed in U.S. Patent No. 6,832,023.

FIG. 9 illustrates an embodiment of a multi-chip coupling utilizing an optical interconnection plane 959 mounted on and/or above microelectronics chips 941 and 942. In this non-limiting embodiment, incoming signals 901 are guided by optical fibers 911. Azimuthally asymmetric LPFGs 921 in the fibers 911 diffract the signals 901 through an optical interconnection plane 959 and into optical receivers 931 on a microelectronics chip 941. In other embodiments, multiple out-coupling LPFGs 921 can be utilized to send the incoming signal 901 to multiple receivers 931. The LPFGs 921 can be optimized to divide transmitted signals 901 as discussed in U.S. Pat. No. 6,832,023.

Optical transmitters 961 on a microelectronics chip 941 emit optical signals 902. The optical signals 902 pass through an optical interconnection plane 959 and into fibers 912 where azimuthally asymmetric LPFGs 922 diffract the signal 902 into a guided mode along the fibers 912. One or more LPFGs 923 located along the fibers 912 diffract the optical signals 902 through the optical interconnection plane 959 and into optical receivers 932 on a separate microelectronics chip 942. Other embodiments of multi-chip coupling can include, but are not limited to, combinations using one or more optical transmitter 961/LPFG 922 pairs and/or one or more out-coupling LPFG 923/optical receiver 932 pairs. Out-coupling LPFGs 923 can be optimized to divide transmitted signals as discussed in U.S. Pat. No. 6,832,023.

Optical transmitters 962 mounted on a microelectronics chip 942 emit outgoing signals 903 through an optical interconnection plane 959 and into optical fibers 913. Azimuthally asymmetric LPFGs 924 diffract the optical signals 903 into an outgoing guided mode along the fiber 913.

Optical interconnection planes 959 also allow for preassembly of optical fibers 911, 912, and 193 for coupling prior to mounting on and/or above the microelectronics chips 941 and 942. This allows for separation of the optical and microelectronic production processes. Additionally, preassembly allows for separate testing of coupling on the interconnection plane 959 prior to and/or after mounting and testing of the microelectronics chips 941 and 942.

Figure 10:
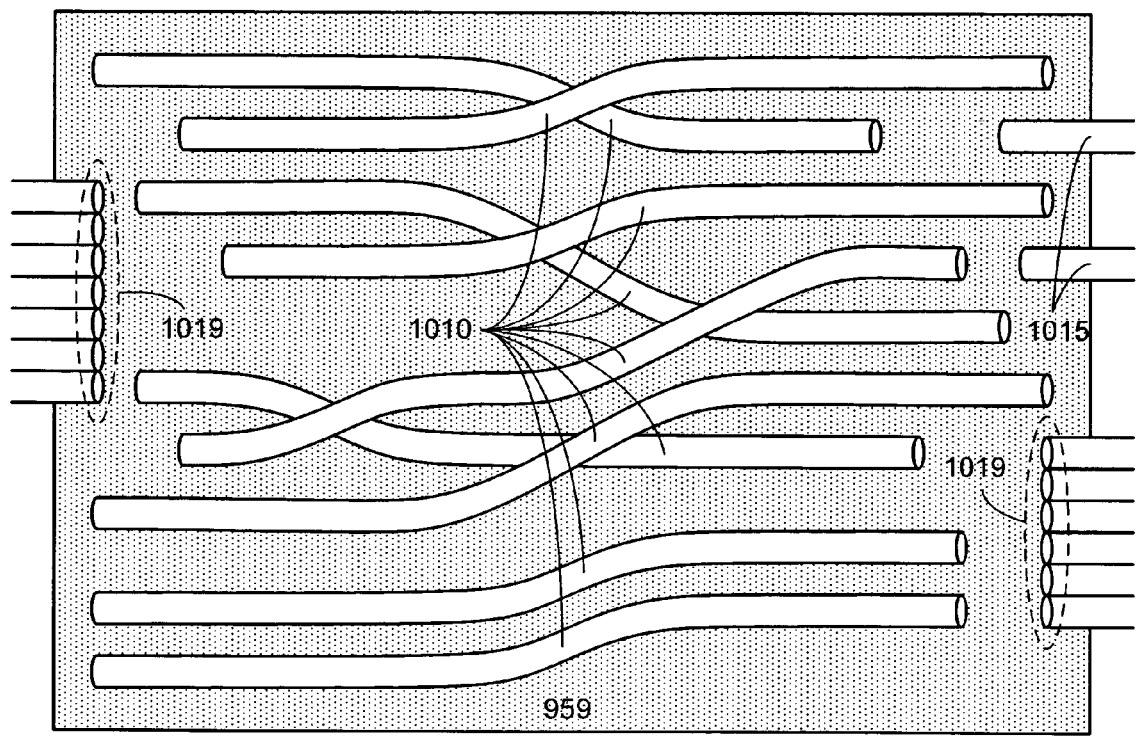
FIG. 10 is an illustration of the top view of an embodiment of an optical interconnection plane with optical fibers for a multi-chip coupling.

FIG. 10 illustrates an embodiment of a top view of an optical interconnection plane 959 mounted above microelectronics chips 941 and 942 (FIG. 9). In this non-limiting embodiment, a number of optical fibers 1010 mounted to the optical interconnection plane 959 provide routing of signals between optical elements, such as, but not limited to, optical receivers, optical transmitters, diffractive elements, and reflective elements, on the microelectronics chips 941 and 942. The LPFGs in the fibers 1010 are aligned with optical elements on the chips 941 and 942 to provide routing of signals between chips and/or between elements on the same chip. Using the flexibility of the fibers 1010, it is possible for the fibers 1010 to cross over each other, as shown, to provide routing between optical elements located at different positions across the chip. Individual optical fibers 1015 and/or fiber ribbons 1019 provide external connections for transmitting incoming and/or outgoing signals to one and/or more chips.

Figure 11:
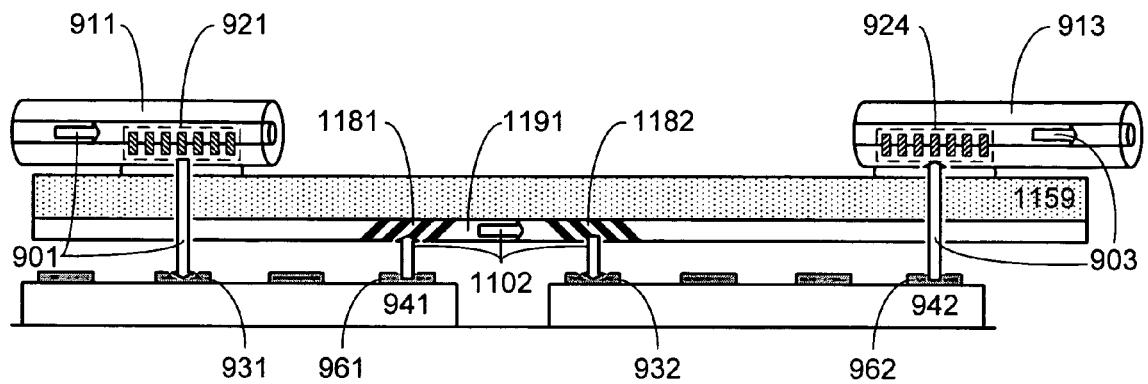
FIG. 11 is a schematic representation of an embodiment of a multi-chip coupling utilizing an optical interconnection plane with waveguides.

FIG. 11 illustrates an embodiment of a multi-chip coupling utilizing an optical interconnection plane 1159 with waveguides 1191 mounted on and/or above microelectronics chips 941 and 942. The types of waveguides 390 can include, but are not limited to, polymer, or glass-based channel (or combinations thereof), ridge, or diffused (or combinations thereof) waveguides. As described in relation to FIG. 9, incoming signals 901 are guided by optical fibers 911. The azimuthally asymmetric LPFGs 921 in the fibers 911 diffract the signals 901 through an optical interconnection plane 1159 and into optical receivers 931 on a microelectronics chip 941.

In this non-limiting embodiment, optical transmitters 961 on a microelectronics chip 941 emit optical signals 1102. The optical signals 1102 are diffracted and/or reflected by waveguide optical elements 1181 into guided modes in waveguides 1191 on the optical interconnection plane 1159. The signals 1102 are routed to other waveguide optical elements 1182 that diffract and/or reflect into optical receivers 932 on a separate microelectronics chip 942.

As described in relation to FIG. 9, the optical transmitters 962 mounted on a microelectronics chip 942 emit outgoing signals 903 through an optical interconnection plane 1159 and into the optical fibers 913. The azimuthally asymmetric LPFGs 924 diffract the optical signals 903 into an outgoing guided mode along the fiber 913.

Figure 12:
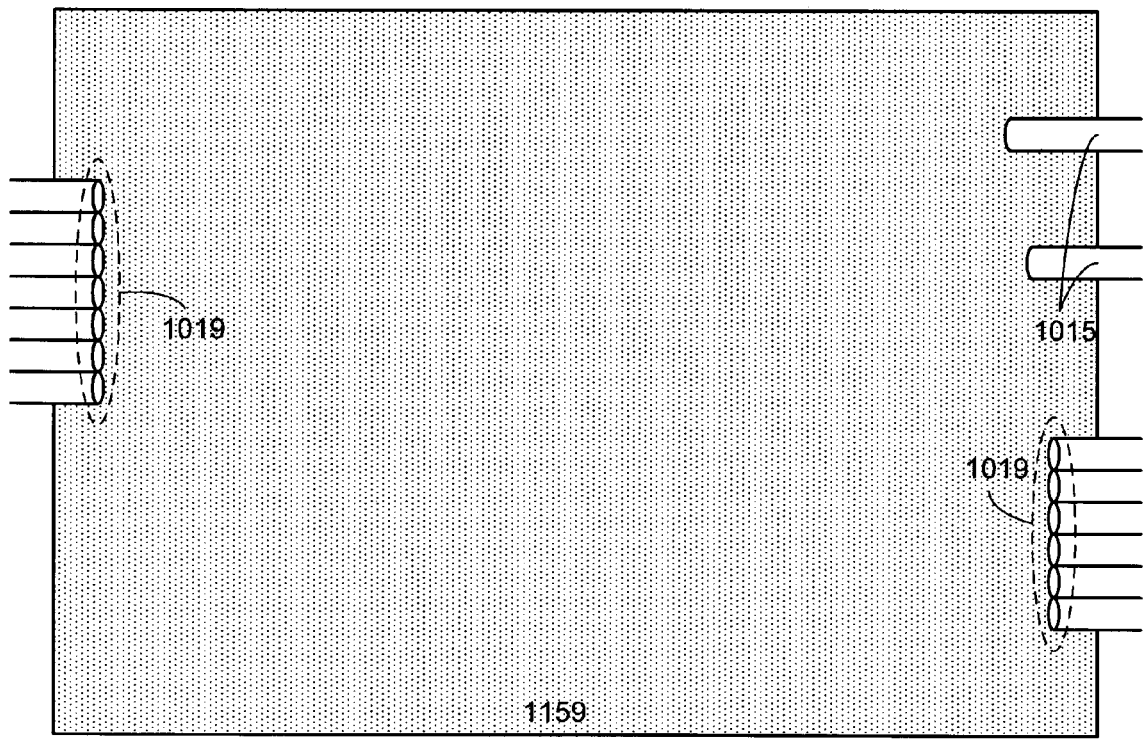
FIG. 12 is an illustration of the top view of an embodiment of an optical interconnection plane with waveguides for a multi-chip coupling.

FIG. 12 illustrates an embodiment of a top view of an optical interconnection plane 1159 with waveguides mounted above microelectronics chips 941 and 942. In this non-limiting embodiment, optical waveguides provide routing of signals between optical elements, such as, but not limited to, optical receivers, optical transmitters, diffractive elements, and reflective elements, on the microelectronics chips 941 and 942. Waveguide optical elements, such as, but not limited to, diffractive and/or reflective elements are aligned with optical elements on the chips 941 and 942 to provide routing of signals between chips and/or between elements on the same chip. Individual optical fibers 1015 and/or fiber ribbons 1019 provide external connections for transmitting incoming and/or outgoing signals to one and/or more chips.

In another embodiment that is not depicted, combinations of optical fibers and/or waveguides, as depicted in FIGS. 9 and 11, can be used for routing of signals between optical elements on the same or different chips. A waveguide can also be used to route a signal from an optical fiber to an optical element on a chip or to another optical fiber.

The embodiments illustrated above can be expanded to include transmission of multiple optical signals at different frequencies through a single optical fiber. The combination of period spacing between the grating elements and number of elements utilized in a LPFG optimizes the coupling of the transmitted signal at a selected wavelength. This allows a LPFG to couple with one optical signal transmitted at the corresponding frequency, while allowing signals at other frequencies to continue through the optical fiber.

Figure 13:
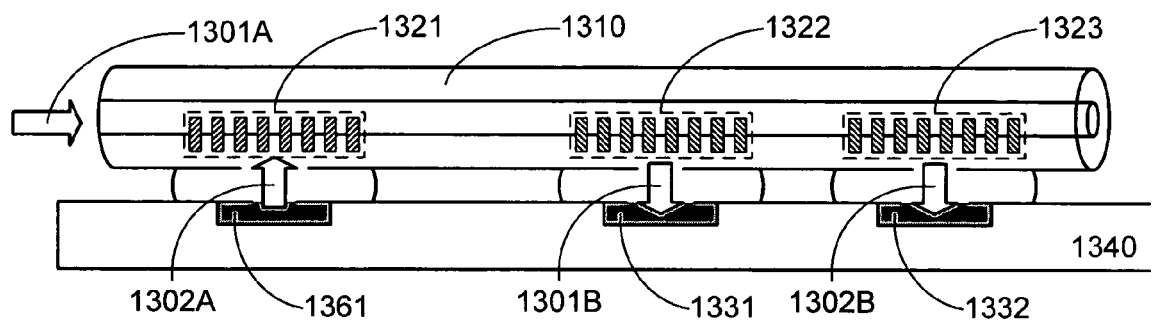
FIG. 13 is a schematic representation of an embodiment of fiber-to-chip and intra-chip fan-out coupling with multiple optical signals transmitted at different frequencies.

FIG. 13 illustrates an embodiment of fiber-to-chip and intra-chip fan-out coupling with multiple optical signals transmitted at different frequencies. In this embodiment, an incoming optical signal 1301A at a first signal frequency is guided by an optical fiber 1310. A first LFPG 1321, optimized for a second optical signal frequency, is aligned with an optical transmitter 1361 on the microelectronics chip 1340. The optical transmitter 1361 emits an optical signal 1302A at the second signal frequency. The first LPFG 1321 in the fiber 1310 diffracts the optical signal 1302A into an outgoing guided mode along the fiber towards the second and third LFPGs 1322 and 1323, while allowing the first signal 1301A to continue along the fiber. The second LFPG 1322 is optimized for the first optical signal frequency and aligned with a first optical receiver 1331 on the microelectronics chip 1340. The second LPFG 1322 in the fiber 1310 diffracts the optical signal 1301B at the first frequency towards the first optical receiver 1331, while allowing the signal 1302A at the second frequency to continue along the fiber 1310. The third LFPG 1323 is optimized for the second optical signal frequency and aligned with a second optical receiver 1332 on the microelectronics chip 1340. The third LPFG 1323 diffracts the optical signal 1302B at the second frequency towards the second optical receiver 1332. Other embodiments of intra-chip fan-out coupling can include, but are not limited to, combinations using one or more optical transmitter/LPFG pairs and/or one or more out-coupling LPFG/optical receiver pairs. Likewise, other embodiments of fiber-to-chip coupling can include, but are not limited to, optical transmitters, diffractive elements, reflective elements, and waveguides.

Optical interconnect planes can be utilized for mounting optical fibers 1310 for transmission of optical signals at multiple frequencies as discussed for FIG. 7. In addition, multiple microelectronic chips can be coupled using optical fibers suitable for transmission of optical signals at multiple frequencies, with or without an interconnect plane, as illustrated in FIGS. 9 and 11.

It should be emphasized that the above-described embodiments of the present disclosure are merely possible examples of implementations, and are merely set forth for a clear understanding of the principles of the disclosure. Many variations and modifications may be made to the above-described embodiments. For example, a plurality of optical fiber and/or waveguide distributions can be included for routing signals between optical elements, such as, but not limited to, optical receivers, optical transmitters, diffractive elements, and reflective elements, on one or more microelectronics chips and/or connections external to the chips. Likewise, multi-chip coupling can be accomplished without the use of an interconnect plane. In addition, a plurality of in-fiber azimuthally asymmetric grating designs, such as, but not limited to, LPFG and short-period fiber Bragg gratings, can be utilized to couple multiple optical frequencies in a single optical fiber. All such modifications and variations are intended to be included herein within the scope of this disclosure and protected by the following claims.

Therefore, the following is claimed:

1. A system comprising:
a microelectronic chip structure including:
an optical fiber including an azimuthally asymmetric fiber grating, wherein the azimuthally asymmetric fiber grating is selected from one of: an azimuthally asymmetric long-period fiber grating and an azimuthally asymmetric short-period fiber Bragg grating; and
a microelectronic chip including at least one optical element, wherein the azimuthally asymmetric fiber grating is adjacent the optical element, wherein the azimuthally asymmetric fiber grating couples a first optical signal frequency to the optical element, wherein the optical element is selected from one of: an optical receiver, an optical transmitter, a diffractive element, and a reflective element.

2. The system of claim 1, wherein the optical fiber includes a second azimuthally asymmetric fiber grating, wherein the microelectronic chip includes at least a second optical element, wherein the second azimuthally asymmetric fiber grating is adjacent the second optical element, and wherein the second azimuthally asymmetric fiber grating couples a second optical signal frequency to the second optical element.

3. The system of claim 1, wherein the optical fiber includes a second azimuthally asymmetric fiber grating, wherein a second device includes at least one optical element, wherein the optical fiber is disposed adjacent to the second device so that the second azimuthally asymmetric fiber grating is aligned with the optical element on the second device.

4. The system of claim 3, wherein the optical fiber is disposed adjacent to the second device.

5. The system of claim 1, wherein the optical element is optically connected with a waveguide that includes optical waveguide elements separated by a length of the waveguide.

6. The system of claim 5, wherein the waveguide optical element selected from one of: a diffractive element and a reflective element.

7. The system of claim 1, wherein the azimuthally asymmetric fiber grating is an azimuthally asymmetric long-period fiber grating.

8. The system of claim 1, wherein the azimuthally asymmetric fiber grating is an azimuthally asymmetric short-period fiber Bragg grating.

9. A system comprising:
a microelectronic chip structure including:
an optical fiber including at least one azimuthally asymmetric fiber grating; and
a microelectronic chip including at least one optical element, wherein the at least one azimuthally asymmetric fiber grating is aligned with the optical element, and wherein the azimuthally asymmetric fiber grating couples a first optical frequency to the optical element.

10. The system of claim 9, wherein the azimuthally asymmetric fiber grating is an azimuthally asymmetric long-period fiber grating.

11. The system of claim 9, wherein the azimuthally asymmetric fiber grating is an azimuthally asymmetric short-period fiber Bragg grating.

12. The system of claim 9, wherein the optical element is selected from one of: an optical receiver, an optical transmitter, a diffractive element, and a reflective element.

13. The system of claim 9, wherein a shape of the optical fiber is selected from one of: a D-shaped and a flattened shape.

14. The system of claim 9, wherein the device is a second optical fiber including at least one azimuthally asymmetric fiber grating.

15. The system of claim 9, wherein the optical fiber is disposed on an interconnection plane, wherein the interconnection plane is adjacent the microelectronic chip.

16. The system of claim 15, wherein the interconnection plane includes at least one waveguide for routing optical signals between optical elements on the device.

17. The system of claim 9, wherein an index-matching compound is disposed between the optical fiber and an interconnection plane, wherein the interconnection plane is adjacent the microelectronic chip, and wherein the index-matching compound is adjacent the azimuthally asymmetric fiber grating and the optical element.

18. The system of claim 9, wherein the optical fiber includes at least two azimuthally asymmetric fiber gratings.

19. The system of claim 18, wherein the microelectronic chip includes at least a second optical element, wherein the second azimuthally asymmetric fiber grating is aligned with the second optical element on the microelectronic chip.

20. The system of claim 18, wherein at least a second device includes at least one optical element, wherein the second azimuthally asymmetric fiber grating is aligned with the optical element on the second device.

21. The system of claim 20, wherein the optical fiber is disposed on at least the first and the second microelectronic chips.

22. The system of claim 20, wherein the optical fiber is disposed on an interconnection plane, wherein the interconnection plane is aligned with at least the first and the second microelectronic chip.

23. The system of claim 22, wherein the interconnection plane includes at least one waveguide for routing optical signals between optical elements on the first and the second devices.

24. The system of claim 18, wherein the first azimuthally asymmetric fiber grating couples a first optical signal frequency and the second azimuthally asymmetric fiber grating couples a second optical signal frequency.

25. The system of claim 18, wherein the optical fiber is one of at least two optical fibers forming a fiber ribbon.

26. The system of claim 25, wherein at least a second optical fiber of the fiber ribbon includes at least one azimuthally asymmetric fiber grating, wherein the microelectronic chip includes at least a second optical element, wherein the azimuthally asymmetric fiber grating of the second optical fiber is aligned with the second optical element.

27. The system of claim 26, wherein the fiber ribbon is disposed on an interconnection plane, wherein the interconnection plane is aligned with the microelectronic chip.

28. A method comprising:
aligning an interconnection plane with a first microelectronic chip including at least one optical element;
aligning an optical fiber including at least one azimuthally asymmetric fiber grating with the interconnection plane so that at least one azimuthally asymmetric fiber grating is aligned with the optical element; and
bonding the optical fiber to the interconnection plane.

29. The method of claim 28, wherein the interconnection plane is aligned with at least the first microelectronic chip and a second microelectronic chip, wherein each of the first microelectronic chip and the second microelectronic chip include at least one optical element.

30. The method of claim 29, wherein the optical fiber is further aligned with the interconnection plane so that a second azimuthally asymmetric fiber grating included in the optical fiber is aligned with the optical element on the second microelectronic chip.

31. A method comprising:
aligning an optical fiber including at least one azimuthally asymmetric fiber grating with an interconnection plane so that, when the interconnection plane is aligned with a microelectronic chip including at least one optical element, at least one azimuthally asymmetric fiber grating is aligned with the optical element;
bonding the optical fiber to the interconnection plane; and
aligning the interconnection plane with the microelectronic chip so that the azimuthally asymmetric fiber grating is aligned with the optical element.

32. The method of claim 31, wherein the interconnection plane is aligned with at least the first microelectronic chip and a second microelectronic chip, wherein each of the first microelectronic chip and the second microelectronic chip include at least one optical element.

33. The method of claim 32, wherein the optical fiber is further aligned with the interconnection plane so that, when the interconnect plane is aligned with the first microelectronic chip and a second microelectronic chip, a second azimuthally asymmetric fiber grating included in the optical fiber is aligned with the optical element on the second microelectronic chip.

* * * * *